US006041907A

United States Patent [19]

Bonnette

[11] Patent Number: 6,041,907

[45] Date of Patent: Mar. 28, 2000

[54] HYDRAULICALLY OPERATED CONCRETE TRANSFER CHUTE

[76] Inventor: Robin E. Bonnette, 6260 Twin Bridges Rd., Alexandria, La. 71303

[21] Appl. No.: 09/048,740

[22] Filed: Mar. 26, 1998

[51] Int. Cl.[7] .................... B65G 11/14

[52] U.S. Cl. .................... 193/6; 193/10; 193/16; 366/68

[58] Field of Search .................... 193/6, 4, 25 C, 193/30, 10; 366/68; 298/6

[56] References Cited

U.S. PATENT DOCUMENTS

| | | | |
|---|---|---|---|
| 2,880,977 | 4/1959 | Maxon, Jr. | 259/171 |
| 2,968,382 | 1/1961 | Oury | 193/10 |
| 3,481,440 | 12/1969 | Jackoboice | 193/10 |
| 4,711,334 | 12/1987 | Barry et al. | 193/6 |
| 5,035,313 | 7/1991 | Smith | 193/2 B |
| 5,178,252 | 1/1993 | Smith | 193/5 |
| 5,551,776 | 9/1996 | Zimmerman | 193/6 |

*Primary Examiner*—William E. Terrell
*Assistant Examiner*—Mark A. Deuble
*Attorney, Agent, or Firm*—David L. Ray

[57] ABSTRACT

A hydraulically operated concrete transfer chute having a plurality of telescoping generally U-shaped chute sections which are arranged to telescope together onto a first chute section pivotally connected to a concrete truck, the inner end of the first chute being aligned to receive the concrete discharged from the concrete truck, the first chute section having a planar bearing surface on each of the top sides and inside of the first chute, each of the two parallel planar bearing surfaces extending from the outer end of the first chute at least to the point at which concrete enters the first chute section, and each of the plurality of telescoping chute sections having a plurality of roller bearings aligned in a row along the inside of each of the top sides of each of the telescoping chute sections, each of the rows of roller bearings being covered on their top side by a planar bearing surface.

10 Claims, 5 Drawing Sheets

HYDRAULICALLY OPERATED CONCRETE TRANSFER CHUTE

BACKGROUND OF THE INVENTION

1. Field of the Invention

The invention relates to chutes for cement mixing trucks. In particular, the invention relates to ready mix type concrete dispensing trucks. More particularly, the present invention is related to hydraulically operated concrete transfer chutes for concrete trucks.

2. Description of the Related Art

Most chutes for transferring ready mix concrete from cement mixing trucks, hereinafter referred to as concrete trucks, have several sections which are hooked together on the job site prior to discharging concrete from the concrete truck. Such hooked together chutes are not hydraulically operated. After concrete is transferred from the concrete truck, the individual sections of the chutes are then washed and stored on the truck.

Such hooked together mixer chutes are cumbersome to use and time consuming to assemble. Furthermore, when the chutes are being assembled it is possible for the operator suffer injuries by catching his fingers or hands in the chute sections which are being hooked or latched together. After assembly, such chutes are difficult to position exactly where it is desired to discharge concrete since the length of the chute is determined by the sum of the lengths of the sections.

Hydraulically operated discharge chutes are known in the art. Exemplary of the hydraulically operated chutes of the prior art are the following U.S. Pat. Nos. 5,178,252 ; 5,035,313; 3,481,440; 2,968,382 and 2,880,977. Such hydraulically operated transfer chutes have not been widely accepted in the industry. One of the principal reasons for their lack of acceptance has been due to the high cost of such hydraulically operated chutes. Another reason for their non-acceptance has been the excessive wear and tear which has occurred on some of the hydraulically operated concrete transfer chutes of the prior art.

It is therefore an object of the invention to provide a hydraulically operated concrete transfer chute which is low in cost.

It is another object of the present invention to provide a hydraulically operated concrete transfer chute which sustains little wear during use.

It is another object of the present invention to provide a hydraulically operated concrete transfer chute which is strong and durable.

SUMMARY OF THE INVENTION

In accordance with the present invention there is provided a hydraulically operated concrete transfer chute having a plurality of telescoping generally U-shaped chute sections which are arranged to telescope together onto a first chute section pivotally connected to a concrete truck, the inner end of the first chute being aligned to receive the concrete discharged from the concrete truck, the first chute section having a planar bearing surface on each of the top sides and inside of the first chute, each of the two parallel planar bearing surfaces extending from the outer end of the first chute at least to the point at which concrete enters the first chute section, and each of the plurality of telescoping chute sections having a plurality of roller bearings aligned in a row along the inside of each of the top sides of each of the telescoping chute sections, each of the rows of roller bearings being covered on their top side by a planar bearing surface.

DESCRIPTION OF THE PREFERRED EMBODIMENTS

Figure 1:
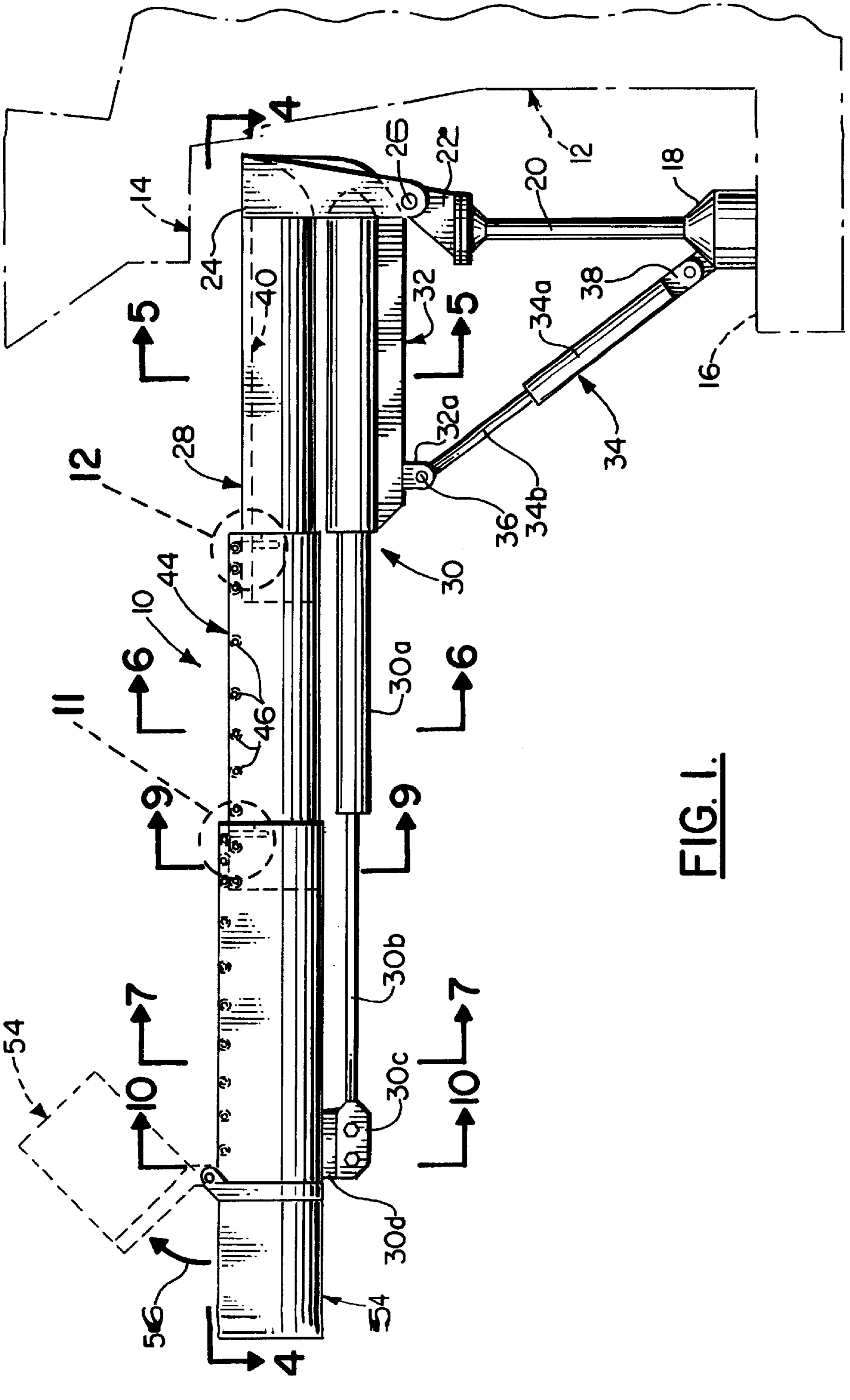
FIG. 1 is shown an elevational view of the hydraulically operated concrete transfer chute of the invention connected to a cement mixer truck shown in phantom lines with the chute being fully extended horizontally from the mixer truck.

Referring now to the drawings, in FIG. 1 is shown the hydraulically operated concrete transfer chute generally indicated by the numeral 10. Transfer chute 10 is connected to the rear of a concrete truck shown in phantom lines in FIG. 1 and is generally indicated by the numeral 12. Concrete truck 12 includes a discharge area generally indicated by the numeral 14 where concrete is selectively dispensed on the first chute section hydraulically operated concrete transfer chute 10.

Concrete truck 12 has a horizontal support beam 16 to which transfer chute 10 is connected. Transfer chute 10 has a connection block 18 which is rigidly secured to support beam 16 by welding, bolting or the like. Extending vertically upward from connection block 18 is a support post 20 which is rotatably and pivotally connected at bracket 22 to yoke 24 by pin 26. Yoke 24 is rigidly connected to the first chute section generally indicated by the numeral 28 of transfer chute 10.

Figure 4:
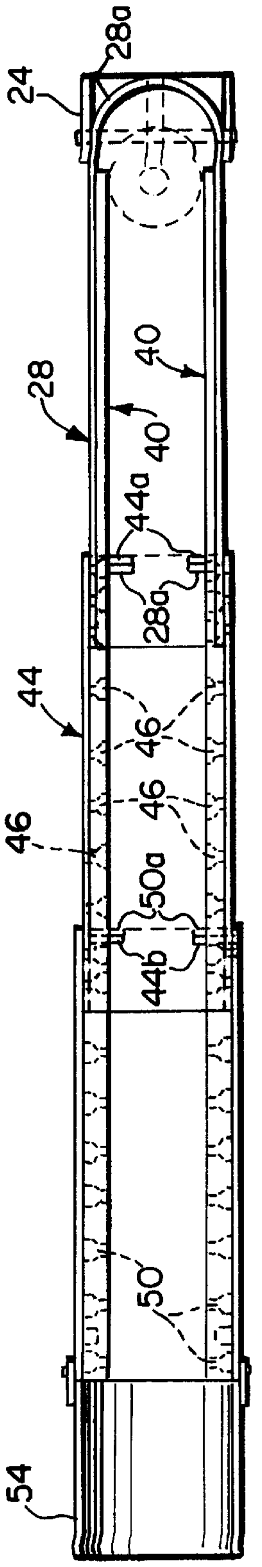
FIG. 4 is a top, plan view taken along lines 4—4 of FIG. 1 of the hydraulically operated concrete transfer chute of the invention.

First chute section 28 of transfer chute 10 is generally U-shaped to contain concrete flowing therethrough. First chute section 28 has a curved end section 28*a* which aligns beneath discharge area 14 of concrete truck 12 as can best be seen in FIG. 4.

A multi-stage hydraulically ram generally indicated by the numeral 30 is connected to first chute section 28 by the rigid strongback generally indicated by the numeral 32. Strongback 32 is rigidly connected to ram 30 and to first chute section 28. Preferably hydraulic ram 30 is a three stage hydraulic ram. Ram 30 has a first telescoping piston 30*a* which is received in ram 30. First telescoping piston 30*a* has a second telescoping piston 30*b* which is received in first telescoping piston 30*a*.

A second hydraulic ram 34 generally indicated by the numeral 34 is connected to the outer end of strongback 32 and to connection block 18. Ram 34 is utilized to raise and lower the discharge end of transfer chute 10. Cylinder 34*a* of ram 34 pivots about pin 38 which is received in bracket 18*a* connected to connection block 18. The outer end of piston 34*b* pivots about pin 36 which is received in bracket 32*a* connected to strongback 32.

Figure 5:
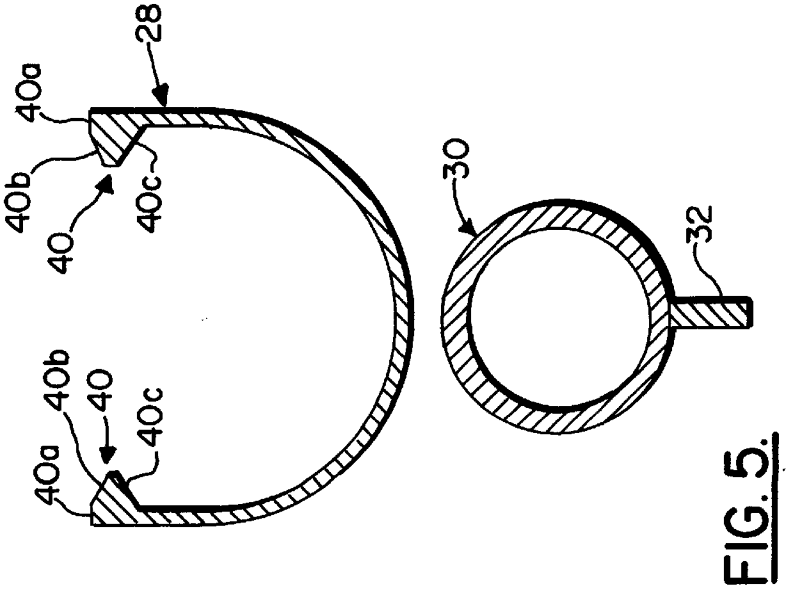
FIG. 5 is an cross-sectional view taken along lines 5—5 of FIG. 1 of the hydraulically operated concrete transfer chute of the invention.
Figure 7:
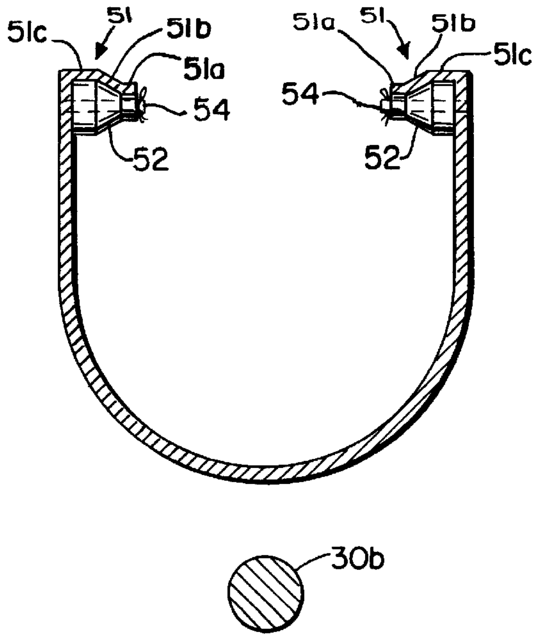
FIG. 7 is a cross-sectional view taken along lines 7—7 of FIG. 1 of the hydraulically operated concrete transfer chute of the invention.

As can best be seen in FIG. 5, located on the upper edges of first chute section 28 are two bearing surfaces generally indicated by the numeral 40—40 which face inwardly toward each other. Bearing surfaces 40—40 each have a flat horizontal bearing surface 40*a*, a downwardly inclined flat surface 40*b*, and an upwardly inclined flat surface 40*c*. Located on the inside of first chute section 28 at a distance from the outer end of first chute section 28 are stops 28*a*–28*a*.

Located adjacent to first section 28 and slidably received thereon is the second U-shaped chute section generally indicated by the numeral 44. Located on the upper edges of second chute section 44 are two bearing surfaces generally indicated by the numeral 45 which face each other. Bearing surfaces 45—45 each have a flat horizontal surfaces 45*a* and 45*c* connected by an intermediate inclined surface 25*b*.

Figure 6:
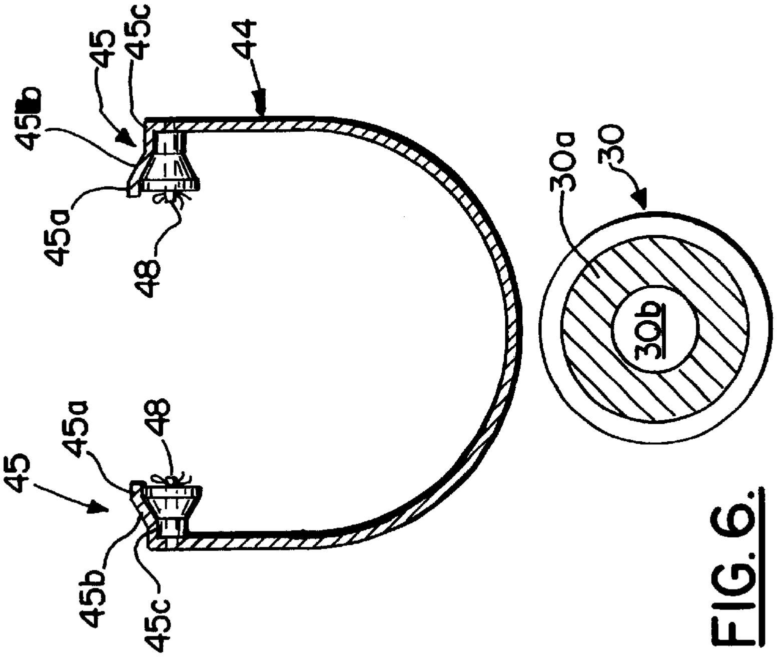
FIG. 6 is a cross-sectional view taken along lines 6—6 of FIG. 1 of the hydraulically operated concrete transfer chute of the invention.
Figure 8:
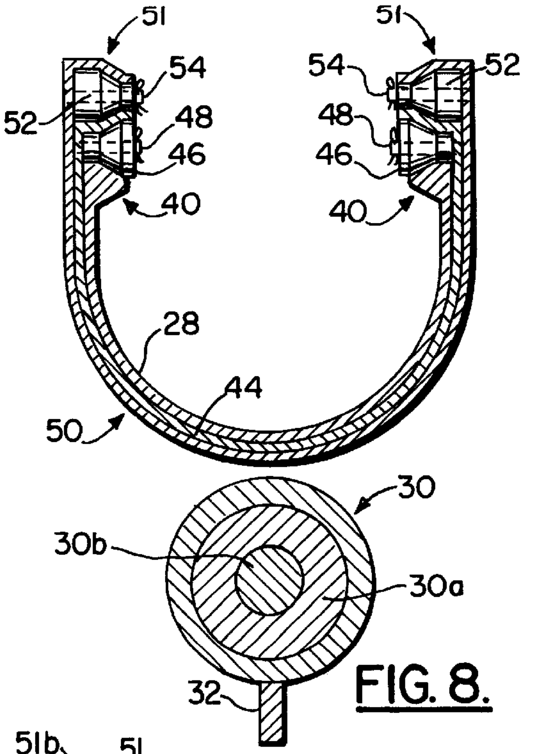
FIG. 8 is a cross-sectional view taken along lines 8—8 of FIG. 2 of the hydraulically operated concrete transfer chute of the invention.
Figure 9:
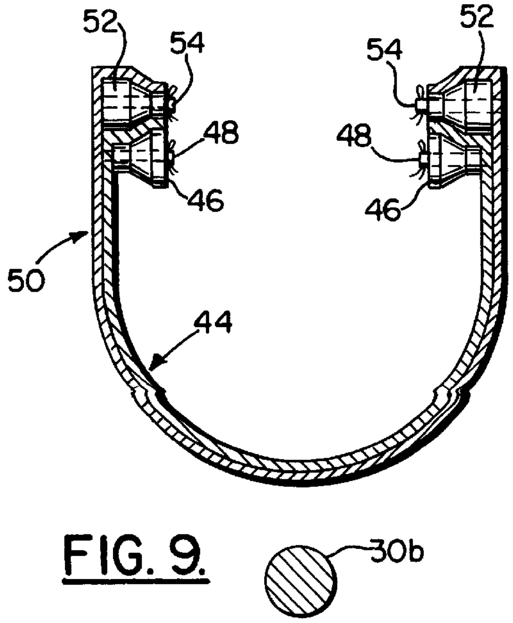
FIG. 9 is a cross-sectional view taken along lines 9—9 of FIG. 1 of the hydraulically operated concrete transfer chute of the invention.
Figure 10:
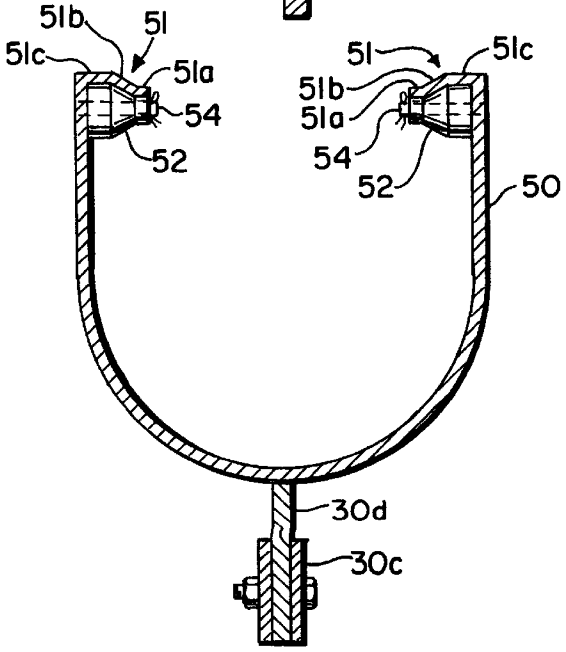
FIG. 10 is a cross-sectional view taken along lines 10—10 of FIG. 1 of the hydraulically operated concrete transfer chute of the invention.

Second chute section 44 has a row of roller bearings 46—46 connected on the inside of each side thereof immediately beneath the bearing surfaces 45 and facing each other. As can be seen in FIG. 6, bearings 46—46 are connected to second chute section 44 by pins 48—48. Roller bearings 46—46 receive flat horizontal bearing surface 40*a* and downwardly inclined flat surface 40*b* of first chute section 28 on the underside thereof. First chute section 28 is slidably received in second chute section 44 as shown in FIG. 8.

Figure 11:
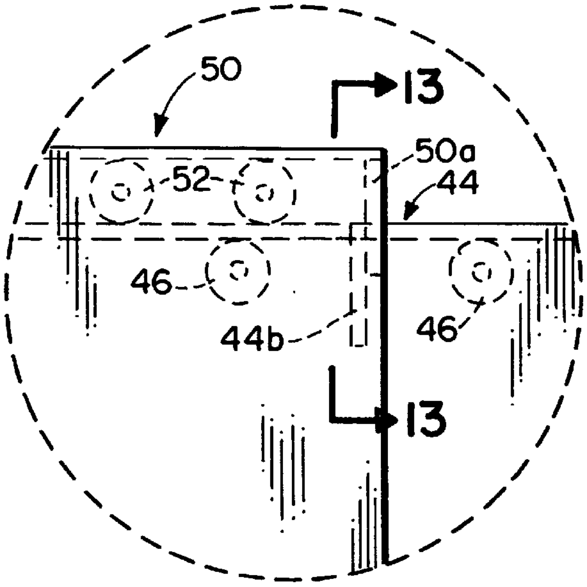
FIG. 11 is a detailed view of the portion of the invention shown in the circle 11 in FIG. 1.
Figure 13:
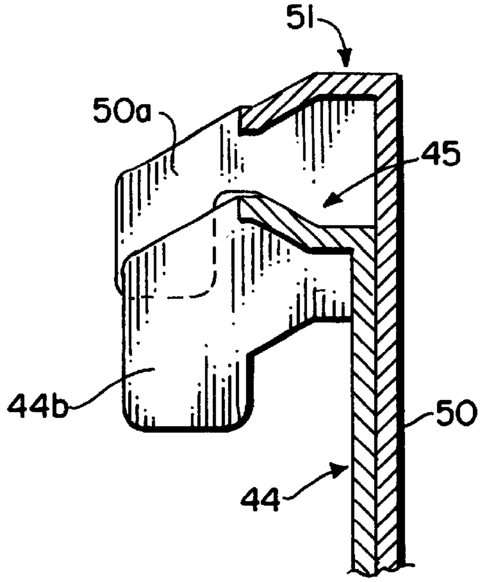
FIG. 13 is a cross-sectional view taken along line 13—13 of FIG. 11.
Figure 12:
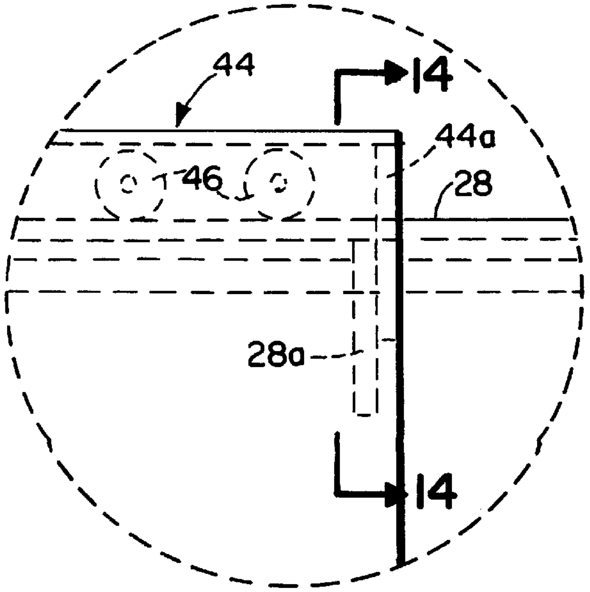
FIG. 12 is a detailed view of the portion of the invention shown in the circle 12 in FIG. 1.
Figure 14:
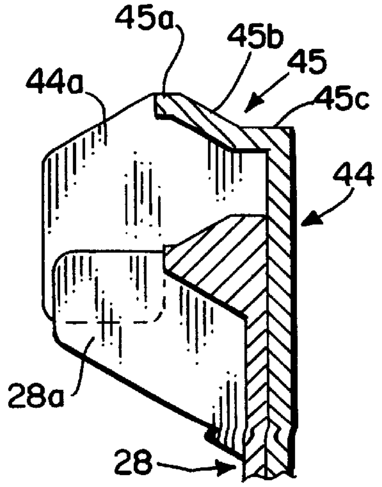
FIG. 14 is a cross-sectional view taken along lines 14—14 of FIG. 12.

Located on the inside of second chute section 44 adjacent to the inner end of second chute section 44 are stops 44*a*—44*a* as can be seen in FIGS. 12 and 14. Stops 44*a*—44*a* contact stops 28*a*13 28*a* to prevent second chute section 44 from sliding off of first chute section 28. Located on the inside of second chute section 44 at a distance from the outer end of second chute section 44 are stops 44*b*—44*b* as can be seen in FIGS. 11 and 13.

A third chute section generally indicated by the numeral 50 is slidably received on second chute section 44. Located on the upper edges of third chute section 50 are two bearing surfaces generally indicated by the numeral 51 which face each other. Bearing surfaces 51—51 each have a flat horizontal surfaces 51*a* and 51*c* connected by an intermediate inclined surface 51*b*.

Third chute section 50 has a row of roller bearings 52—52 connected on the inside of each side thereof immediately beneath the bearing surfaces 45 and facing each other. As can be seen in FIG. 6, bearings 52—52 are connected to third chute section 50 by pins 54—54. Roller bearings 52—52 receive flat horizontal bearing surface 45*a* and 45*c* and inclined flat surface 45*b* of second chute 44 on the underside thereof. Second chute section 44 is slidably received in third chute section 50 as shown in FIG. 8.

Located on the inside of third chute section 50 adjacent to the inner end of third chute section 50 are stops 50*a*—50*a* . Stops 50*a*—50*a* contact stops 44*b*—44*b* as shown in FIGS. 11 and 13 to prevent third chute section 50 from sliding off of second chute section 50.

Second telescoping piston 30*b* is connected by bracket 30*c* by rib 30*d* to the bottom of third chute 50. Located at the outer end of chute 10 is a conventional rotatable U-shaped section generally by the numeral 54 which can rotate upwardly as indicated by the arrow 56 in FIG. 1. U-shaped section 54 may be omitted if desired.

Figure 2:
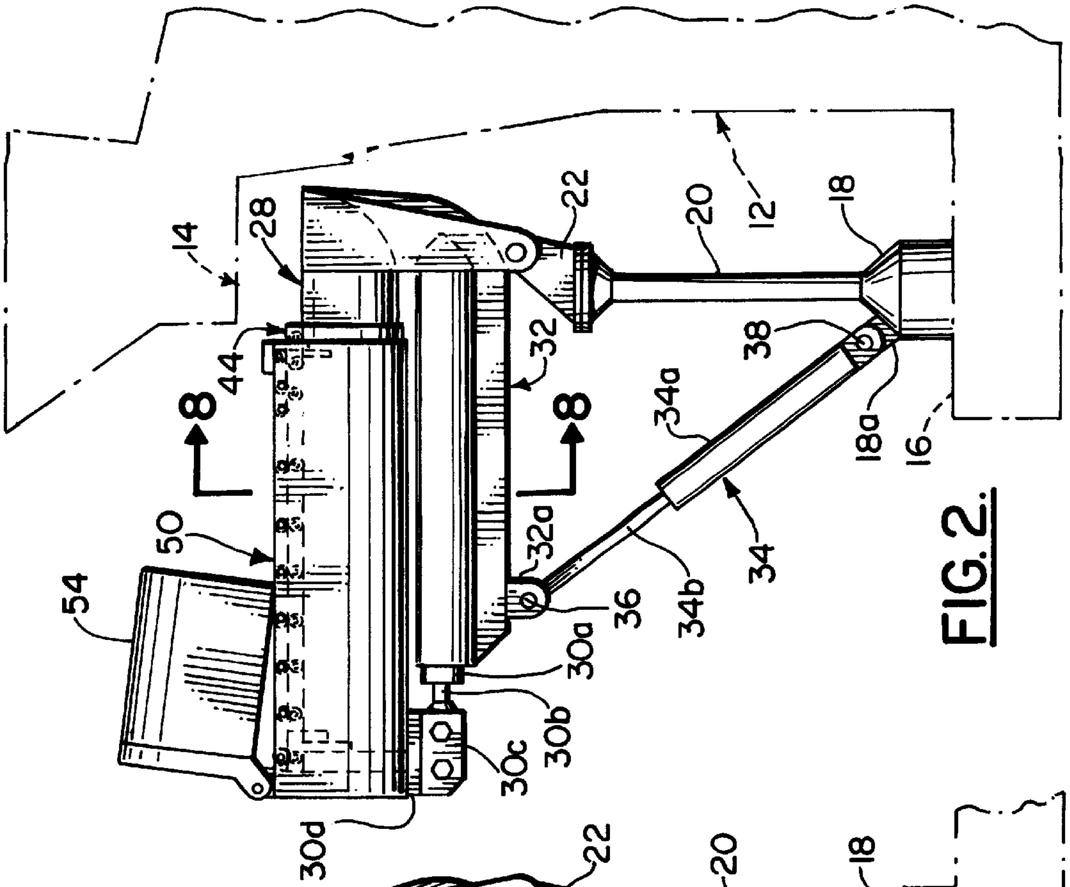
FIG. 2 is a elevational view of the hydraulically operated concrete transfer chute of the invention in the nested or telescoped position.
Figure 3:
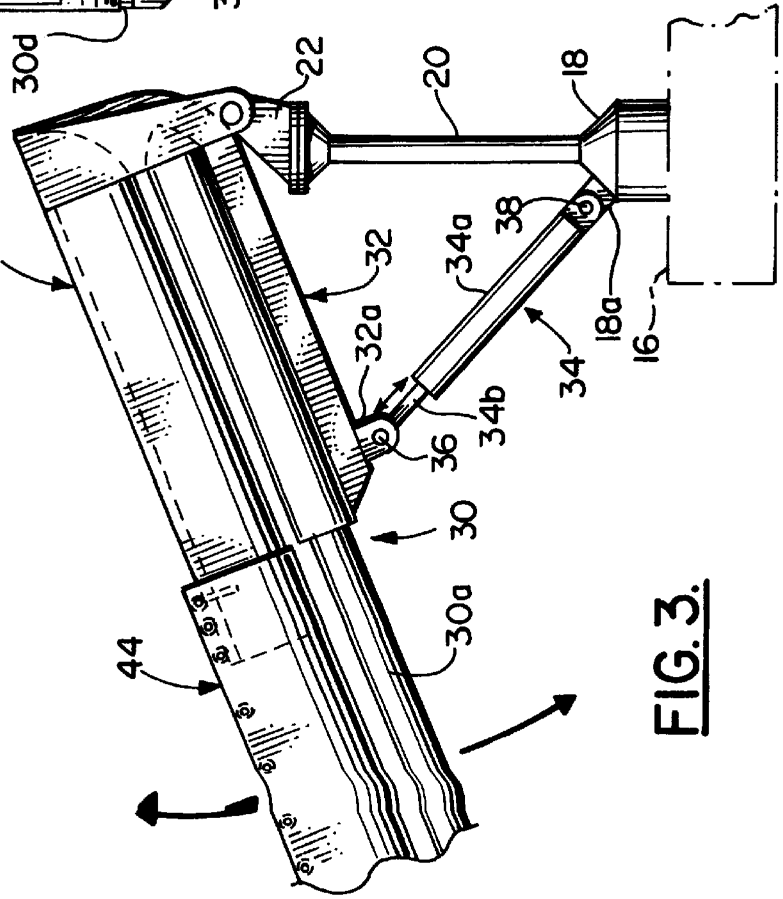
FIG. 3 is a elevational view of the hydraulically operated concrete transfer chute of the invention, partially cut away, with the chute being inclined downwardly for dispensing concrete from a cement mixer truck.

The concrete transfer chute 10 may be stored when concrete truck 12 is traveling in the position shown in FIG. 2. When it is desired to transfer concrete with chute 10, chute 10 is extended to the position shown in FIG. 1 by extending hydraulic ram 30 and manually rotating chute 54 downwardly to the position shown in FIG. 1. Hydraulic ram 34 may then be retracted to the position shown in FIG. 3 to transfer concrete through chute 10. Chute 10 can be rotated on support post 10 to position the end of chute 10 in the area in which concrete is to be poured.

Hydraulic rams 30 and 34 have conventional remote controls and hydraulic (not shown) for operating both rams.

Although the preferred embodiments of the invention have been described in detail above, it should be understood that the invention is in no sense limited thereby, and its scope is to be determined by that of the following claims:

What is claimed is:

1. A hydraulically operated concrete transfer chute for connection to a concrete truck comprising:

a. a first U-shaped chute section pivotally connected to a concrete truck, said first chute section having an inner end and an outer end, said inner end of said first chute section being aligned to receive concrete discharged from said concrete truck, said first chute section having an extended bearing surface inside each of the top sides of said first chute section, each of said two extended bearing surfaces extending from the outer end of said first chute section at least to the point at which concrete enters the first chute section, b. a second U-shaped chute section slidably connected to said first U-shaped chute section and adapted to telescope thereover, said second U-shaped chute section having an inner end and an outer end, said second chute section having an extended bearing surface inside each of the top sides of said second chute section, each of said two extended bearing surfaces extending from the outer end of said second chute section to the inner end of said second chute section, said second chute section having a plurality of roller bearings thereon aligned in a row along the inside each of the top sides of said second chute section, each of said rows of roller bearings being covered on their top side by an extended bearing surface, and c. a third U-shaped chute section slidably connected to said first U-shaped chute section and adapted to telescope thereover, said third U-shaped chute section having an inner end and an outer end, said third chute section having an extended bearing surface inside each of the top sides of said third chute section, each of said two extended bearing surfaces extending from the outer end of said third chute section to the inner end of said third chute section, said third chute section having a plurality of roller bearings thereon aligned in a row along the inside each of the top sides of said third chute section, each of said rows of roller bearings being covered on their top side by an extended bearing surface.

2. The concrete transfer chute of claim 1 wherein a hydraulic ram is connected to first chute section and to said third chute section to extend and telescope said first, second, and third chute sections.

3. The concrete transfer chute of claim 1 wherein a hydraulic ram is connected to first chute section and to said truck to raise and lower the outer end of said concrete transfer chute.

4. A hydraulically operated concrete transfer chute for connection to a concrete truck comprising:

a. a first U-shaped chute section pivotally connected to a concrete truck, said first chute section having an inner end and an outer end, said inner end of said first chute section being aligned to receive concrete discharged from said concrete truck, said first chute section having an extended bearing surface inside each of the top sides of said first chute section, each of said two extended bearing surfaces extending from the outer end of said first chute section at least to the point at which concrete enters the first chute section, b. a second U-shaped chute section slidably connected to said first U-shaped chute section and adapted to telescope thereover, said second U-shaped chute section having an inner end and an outer end, said second chute section having an extended bearing surface inside each of the top sides of said second chute section, each of said two extended bearing surfaces extending from the outer end of said second chute section to the inner end of said second chute section, said second chute section having a plurality of roller bearings thereon aligned in a row along the inside each of the top sides of said second chute section, each of said rows of roller bearings being covered on their top side by an extended bearing surface, and c. a third U-shaped chute section slidably connected to said first U-shaped chute section and adapted to telescope thereover, said third U-shaped chute section having an inner end and an outer end, said third chute section having an extended bearing surface inside each of the top sides of said third chute section, each of said two extended bearing surfaces extending from the outer end of said third chute section to the inner end of said third chute section, said third chute section having a plurality of roller bearings thereon aligned in a row along the inside each of the top sides of said third chute section, each of said rows of roller bearings being covered on their top side by an extended bearing surface, wherein a hydraulic ram is connected to said first chute section and to said third chute section to extend and telescope said first, second, and third chute sections, and said each of said first, second, and third chute sections have at least one stop therein for preventing each of the chute sections from sliding off of an adjacent section.

5. The concrete transfer chute of claim 4 wherein said extended bearing surfaces in said first chute section are parallel.

6. The concrete transfer chute of claim 4 wherein said extended bearing surfaces in said second chute section are parallel.

7. The concrete transfer chute of claim 4 wherein said extended bearing surfaces in said third chute section are parallel.

8. The concrete transfer chute of claim 4 wherein said first chute section has a stop connected thereto, and said second chute section has a stop connected thereto for engaging said stop in said first chute section to prevent said second chute from sliding off of said first chute section.

9. The concrete transfer chute of claim 8 wherein said second chute section has a stop connected thereto, and said third chute section has a stop connected thereto for engaging said stop in said second chute section to prevent said third chute section from sliding off of said second chute section.

10. The concrete transfer chute of claim 4 wherein said second chute section has a stop connected thereto, and said third chute section has a stop connected thereto for engaging said stop in said second chute section to prevent said third chute section from sliding off of said second chute section.

* * * * *